May 3, 1932.　　　C. W. GORDON　　　1,856,072
JOINT
Filed July 10, 1929　　　2 Sheets-Sheet 1
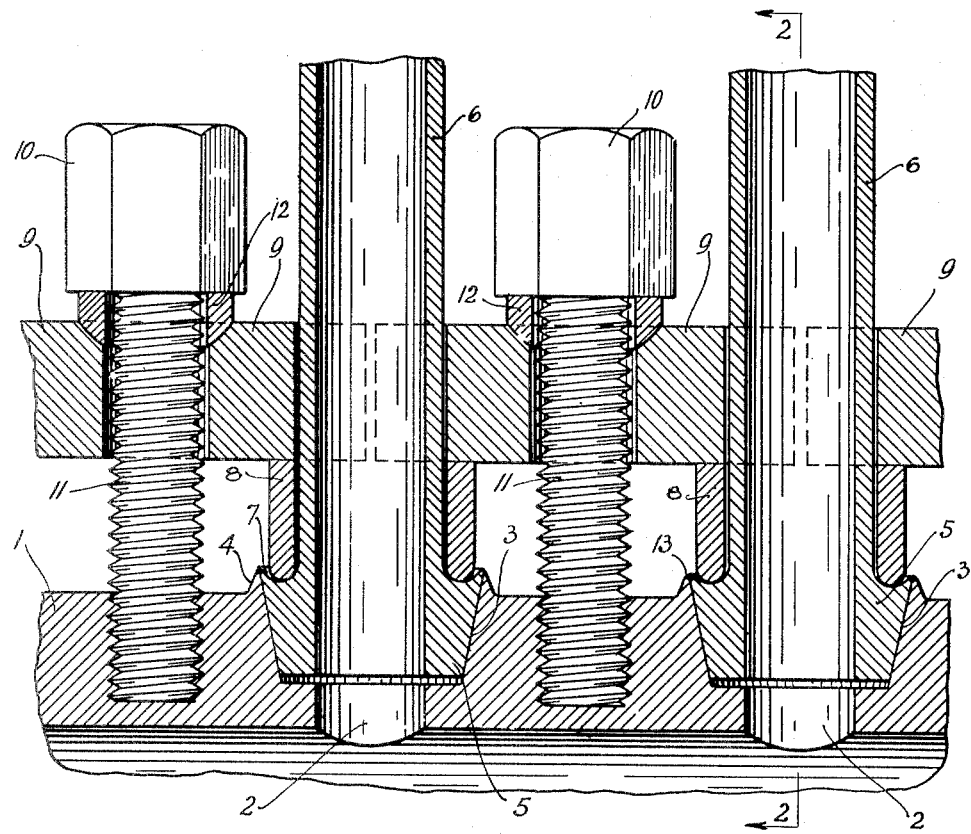
Fig-1-
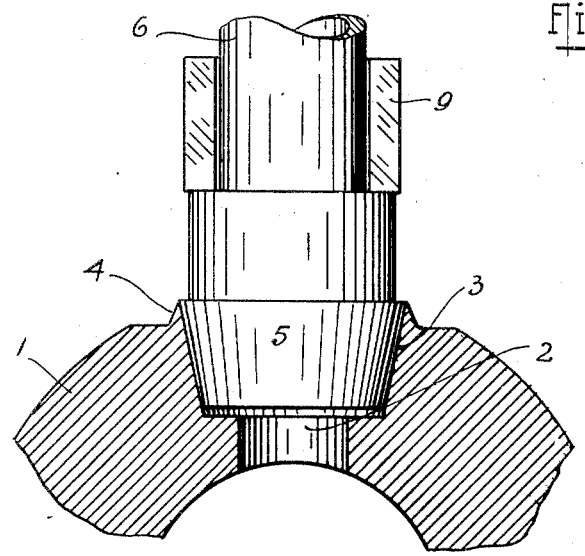
Fig-2-
INVENTOR
CHARLES W. GORDON
BY
ATTORNEY

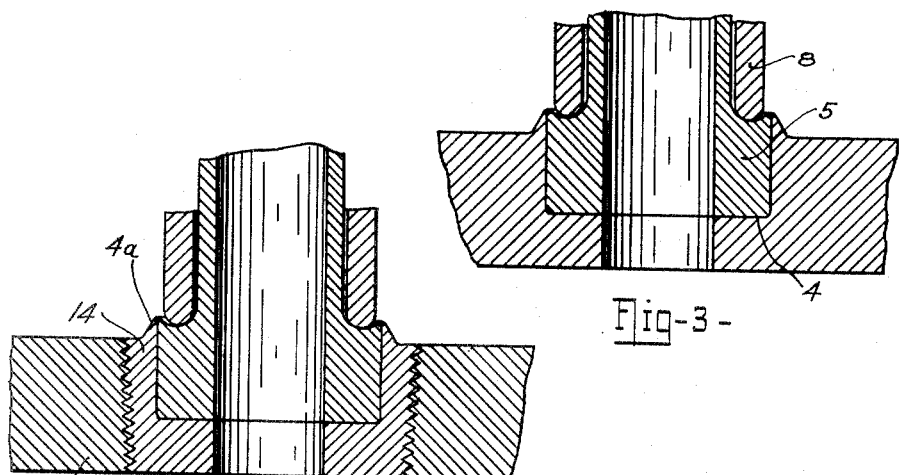
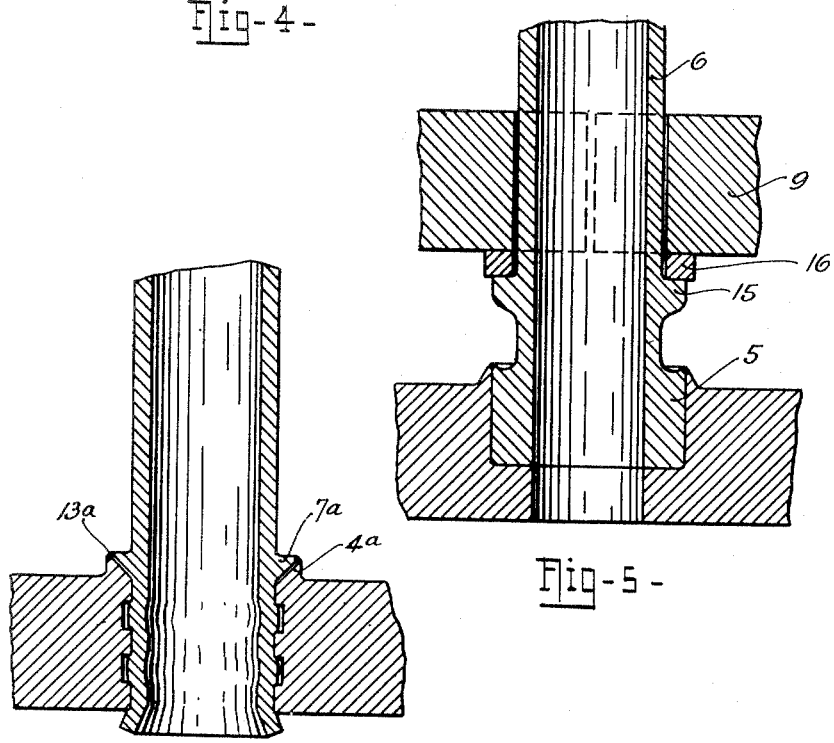

Patented May 3, 1932

1,856,072

UNITED STATES PATENT OFFICE

CHARLES W. GORDON, OF PLEASANTVILLE, NEW YORK, ASSIGNOR TO THE SUPERHEATER COMPANY, OF NEW YORK, N. Y.

JOINT

Application filed July 10, 1929. Serial No. 377,210.

This invention relates to means for connecting pipes to headers or plates. The particular field in connection with which it was developed is that of superheaters and reheaters although it will be apparent from what follows that its application is not limited to any one field.

In superheaters particularly, and in many other relations where pipes are connected to headers, it is highly desirable to have a joint between the two, which, while entirely tight, can yet readily be dismantled and reassembled. Various joints of this kind have been proposed in the past, and many of them have gone into extensive use. All of them, however, have some defects or difficulties which it is the intention of the present invention to remove. Thus, in some forms of such joints in common use the joint may be perfectly tight under normal conditions of operation. When however a sudden change in conditions occurs and the tube and head are temporarily of different temperatures, the joint may open up slightly. This itself may be bad enough, but a worse feature is that sediment may be carried into the joint preventing the tube from becoming properly seated on the reestablishment of normal conditions, and so starting a small leak which will increase in size. By means of my invention this difficulty is removed.

The invention is illustrated in the drawings accompanying this specification in which Fig. 1 illustrates a longitudinal section through a portion of a superheater header, two pipes being shown joined to the header by my improved means; Fig. 2 shows a section on line 2—2 of Fig. 1; Fig. 3 shows a fragmentary view of a section similar to that of Fig. 1 illustrating a modification; Figs. 4, 5. and 6 show similar views of further modifications.

A portion of the header to which the pipes are shown joined appears at 1. At the points where it is desired to secure the pipe holes or apertures 2—2 are formed, the outer ends of which are given a conical shape as at 3. In practice this conical form can extend all the way through the header, the advantage in not extending it through being that no more material is removed than necessary thereby saving the strength of the header. Surrounding the outer end of the openings 2 is a lip 4. This is formed in any desired way although the preferable manner of shaping it is by machining the portion of the header where these lips are to be formed leaving the upstanding lip. It will be noted that the lip is wedge shaped in cross section with a rather sharp outer edge. Seated in each conical hole 3 is the enlarged conical head 5 formed integrally on the pipe 6. This enlarged head is produced by upsetting and suitably machining the end of the pipe.

Adjacent to the lip 4 of the header and contacting with it around the entire circumference is the lip 7 on the outer side or back of the enlargements 5. Its shape will be clear from an inspection of Fig. 1. It is likewise wedge shaped in cross section with a thin outer edge. The conformation of the parts is such that the two thin edges of these lips lie in contact with each other.

The pipe is urged against this conical seat 3 in any preferred manner. In Fig. 1 I illustrate the form which I prefer. An annular washer or ring 8 engages the back of the head 5, this ring 8 being forced against the back of the head by the clamps 9—9 and nuts 10—10 screwed on the stud 11—11. Between the nuts 10—10 and the clamps 9—9 are interposed further washers 12—12. It will be noted that each clamp 9 engages the rings 8 of two adjacent pipes.

The function of the clamping apparatus just described is principally to hold the pipes and the header fixed in their relative positions. While the seats are shaped so that they may form a fairly tight joint I do not rely on this for tightness, but for this purpose weld or fuse together the outer thin edges of the two lips. This is indicated at 13. The left hand pipe of the two shown in Fig. 1 is shown as it appears before the welding is performed. The weld is an extremely light joint formed by a rather slight fusion of the two lips along their thin edges. It is preferably made by means of an oxyacetylene flame, no addition of material being normally required beyond that supplied by the lips themselves.

This joint is perfectly tight in practice and can readily be dismantled and reassembled. To dismantle it, after the removal of the clamps the fused portion of the metal is removed by any means preferably by a slight amount of filing or scraping. It is found in practice that the amount of material removed is very slight and that the structure can be reassembled and welded again and that dismantling and reassembling can be repeated a number of times.

In the form shown in Fig. 3 it will be noted that instead of the conical seat 3 a stepped seat 4 is provided against which the enlarged head 5 is urged by the ring 8. Except for this, the joint is made just as that first described.

In Fig. 4 is illustrated a case of a header made of material which is not readily welded to the pipe. In such a case a bushing 14 is first screwed or otherwise secured in the header 1. This bushing is provided with the lip 4a and the seat and joint are as described above.

It may be desirable in some cases to form a separate abutment against which pressure may be exerted to hold the pipe in place instead of using the back of the enlarged head itself. A form using such a separate abutment is shown in Fig. 5. The joint proper is made exactly as in Fig. 3 but the separate abutment 15 is formed on the pipe 6 above the enlarged head 5. Against this abutment 15 the clamp 9 presses either directly or through a ring 16.

In Fig. 6 is illustrated a form in which clamping means are dispensed with, the pipe being rolled into the plate and beaded over. The two lips 7a and 4a are essentially like those described in connection with the previous forms and are welded or fused together along their thin edges as at 13a.

It will be obvious that further modifications can readily be introduced without departing from the essence of the invention.

I claim:

1. In apparatus of the class described, the combination of a metallic perforated wall, a pipe held in fixed relation against the wall and in communication with said perforation, and means making a seal between the pipe and the wall comprising two circular concentric lips, one on the pipe and one on the wall, said lips being on the same side of the wall as the pipe and being fused together along their outer edges.

2. In apparatus of the class described, the combination of a metallic perforated wall with a seat surrounding the perforation, a pipe engaging the seat, means to keep the pipe in such engagement, and means making a seal between the pipe and the wall comprising a circular lip surrounding the pipe and integral with it and a circular lip on the wall on the same side as the pipe engaging the first named lip throughout their length, said lips being fused together along their outer edges.

3. In apparatus of the class described, the combination of a metallic perforated wall with a seat surrounding the perforation, a pipe with an upset end, means to press said upset end into engagement with said seat, and means to make a seal between the pipe and wall comprising an upstanding circular lip on the wall on the same side as the pipe and surrounding the perforation, and a circular lip on the pipe in contact with the wall lip around their entire circumference, the outer ends of the lips coming to an edge, the two lips being fused together along said edge.

4. Apparatus in accordance with claim 3, the first-named means comprising an abutment integral with the pipe and an element engaging the abutment and pressing it toward the seat.

CHARLES W. GORDON.